United States Patent
Burge

(10) Patent No.: US 9,613,136 B2
(45) Date of Patent: Apr. 4, 2017

(54) ASSERTION QUALITY ASSESSMENT AND MANAGEMENT SYSTEM

(71) Applicant: Pandexio, Inc., Hermosa Beach, CA (US)

(72) Inventor: John Richard Burge, Manhattan Beach, CA (US)

(73) Assignee: PANDEXIO, INC., Hermosa Beach, CA (US)

( * ) Notice: Subject to any disclaimer, the term of this patent is extended or adjusted under 35 U.S.C. 154(b) by 399 days.

(21) Appl. No.: 14/162,593

(22) Filed: Jan. 23, 2014

(65) Prior Publication Data

US 2014/0207766 A1 Jul. 24, 2014

Related U.S. Application Data

(60) Provisional application No. 61/755,839, filed on Jan. 23, 2013.

(51) Int. Cl.
  *G06F 17/30* (2006.01)

(52) U.S. Cl.
  CPC .. *G06F 17/30722* (2013.01); *G06F 17/30728* (2013.01)

(58) Field of Classification Search
  CPC ............... G06F 17/30722; G06F 17/30728
  See application file for complete search history.

(56) References Cited

U.S. PATENT DOCUMENTS

| | | | |
|---|---|---|---|
| 6,973,616 B1 | 12/2005 | Cottrille et al. | |
| 8,074,165 B2 | 12/2011 | Baldonado et al. | |
| 8,165,974 B2 | 4/2012 | Privault et al. | |
| 8,166,028 B1 | 4/2012 | Reynar et al. | |
| 8,214,734 B2 | 7/2012 | Grabarnik et al. | |
| 2006/0064394 A1* | 3/2006 | Dettinger | G06F 17/30876 |
| 2008/0229828 A1* | 9/2008 | Buschman | G06F 17/30728 73/579 |
| 2009/0024605 A1* | 1/2009 | Yang | G06F 17/30873 |

(Continued)

FOREIGN PATENT DOCUMENTS

WO 2012/040621 3/2012

OTHER PUBLICATIONS

Bendersky, M. et al., "Quality-Biased Ranking of Web Documents", WSDM '11, Feb. 9-12, 2011, Hong Kong, China.

(Continued)

*Primary Examiner* — James E Richardson
(74) *Attorney, Agent, or Firm* — Fish & Tsang, LLP

(57) ABSTRACT

An assertion assessment system is presented. An assertion object that represents a relationship between an assertion and an information source can be bound to a quality measure as an indication of the quality of the assertion object. The assertion assessment system enables different recipients of assertion objects that are linked to information sources to assess assertion quality of the assertion objects. The assertion assessment system manages and tracks these assessments of the assertion objects and provides useful indications to the recipients. Thus, workers who come upon an assertion can make a judgment on the quality of the assertion based on assessment made by other workers, without going through the information source that supports the assertion.

29 Claims, 4 Drawing Sheets

(56) References Cited

U.S. PATENT DOCUMENTS

| | | | |
|---|---|---|---|
| 2009/0192968 A1* | 7/2009 | Tunstall-Pedoe | G06N 5/02 706/47 |
| 2011/0145219 A1* | 6/2011 | Cierniak | G06F 17/30867 707/709 |
| 2011/0258326 A1* | 10/2011 | Hu | H04L 63/062 709/226 |
| 2011/0270856 A1* | 11/2011 | Dettinger | G06F 17/30882 707/758 |
| 2011/0313989 A1* | 12/2011 | Ghosh | G06F 17/30728 707/706 |
| 2012/0233154 A1 | 9/2012 | Walther et al. | |
| 2012/0297182 A1 | 11/2012 | Hawkins | |
| 2013/0014243 A1* | 1/2013 | Chen | H04L 67/2804 726/8 |

OTHER PUBLICATIONS

McGee, M., "Google Search Quality Raters Instructions Gain New "Page Quality" Guidelines", Search Engine Land, Sep. 7, 2012, http://searchengineland.com/google-search-quality-raters-instructions-gain-new-page-quality-guidelines-132436.

Shaw, A. Explore Source: A New Feature to "Show Our Work", The PropPublica Nerd Blog, Dec. 15, 2011, www.propublica.org/nerds/item/explore-sources-a-new-feature-to-show-our-work.

\* cited by examiner

Figure 4

ASSERTION QUALITY ASSESSMENT AND MANAGEMENT SYSTEM

This application claims the benefit of U.S. Provisional Application No. 61/755,839, filed Jan. 23, 2013. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is assessing the quality of assertions, and more particularly a system and method for managing and tracking assertion quality.

BACKGROUND

The background description includes information that may be useful in understanding the present invention. It is not an admission that any of the information provided herein is prior art or relevant to the presently claimed invention, or that any publication specifically or implicitly referenced is prior art.

As countries around the world transition from industrial-based economies to knowledge-based economies, it is increasingly important that we develop systems and methods for assessing the quality of knowledge-based processes, workers and their output.

In executing knowledge-based processes, knowledge workers (e.g., employees of an organization, students, teachers, professors, researchers, etc.) frequently read articles of content and make notes, conclusions, impressions, and/or perceptions (collectively as "assertions") about what they have learned out of what they have read. Examples of assertions include capturing facts or findings, voicing opinions, asking questions and drawing conclusions. In some cases, knowledge workers will rely on these assertions for making decisions, making recommendations to decision-makers or integrating their assertions into new content they create and some cases publish/distribute.

Historically, we have relied on citation-based reference systems to assess the quality of assertions found in written content that are derived-from, or otherwise supported-by, other articles of content. Standards have been developed in various professional domains which promote consistency of creating footnotes, endnotes and bibliographies, facilitating the ability of the reader to verify assertions found in written content.

Citation-based reference systems present several limitations. They require significant time and effort by knowledge workers who create and rely on them, while introducing numerous opportunities for errors and misuses. Examples of processes citation authors have to execute include source identification, citation capture, page referencing, and formatting. Errors in any of these processes can result in the failure of the quality control system, and numerous opportunities for errors are present. These processes usually take place across multiple systems, requiring the transposing of information from one system to another system. In addition, they frequently involve the copying/pasting of information, and may involve paper-based processes which occur offline and are not electronically auditable. The citation reader has to execute several processes as well. They have to read the footnotes or endnotes, use that information to search for the source documents, acquire the source documents, navigate to the appropriate location within the source documents and make an assessment about the veracity of the source document and its author as well as the merits of the fit between the specific section in the source work and the proposition in the authored work.

Citation systems do not provide means for even capturing assessments of assertion quality such that they could be used in a system for assessing the quality and performance of knowledge-based processes, workers and their output. No means to capture assessments, manage them or use them to advance or improve knowledge work.

Efforts have been made to improve on the citation process with the help of computer technologies and the Internet. For example, hyperlinking keywords or key phrases in online articles within Wikipedia® can alleviate some of the manual work associated with citation-based references.

In another example, the "Explore Sources" feature created by DocumentCloud, an open source project sponsored by the Knight Rider foundation, provides readers of a written work direct access to the source documents and excerpts within those source documents, as disclosed in the article entitled "Explore Sources: A New Feature to 'Show Our Work'" by Al Shaw, published on Dec. 15, 2011. While DocumentCloud reduces some of the manual work associated with creating and linking to references, it does not provide an assertion-quality assessment system—or even a means to capture an assessment.

With respect to rating, U.S. patent publication 2012/0297182 to Hawkins titled "Cipher and Annotation Technologies for Digital Content Devices", filed Mar. 17, 2012, discloses a mechanism that allows readers to rate annotations (i.e., comments) of a document. However, the annotations described in Hawkins refer to comments made on a document, rather than independent assertion objects that are supported by or referenced to one or more documents. In addition, the rating system disclosed in Hawkins merely allows readers to indicate how much they liked the comments on the annotations and do not provide any meaningful indication of the quality of assertions made by the annotations in relation to its associated literals.

As such, knowledge enterprises and their workers are in need of a better system for assessing the quality of written works.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment.

In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems, and methods in which an assertion object that represents a relationship between an assertion and an information source can be bound to a quality measure as an indication of the quality of the assertion object. According to some embodiments of the invention, the apparatus, systems, and methods enable recipients of assertion objects that are linked to information sources to assess assertion quality, as well as manage and track assertions. Thus, workers who come upon an assertion can make a judgment on the quality of the assertion without going through the information source that supports the assertion. In one aspect of the invention, an assertion assessment system is presented that provides the mechanisms to obtain quality measures and bind the quality measures to different assertion objects.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 4 illustrates a possible assertion object user interface.

DETAILED DESCRIPTION

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
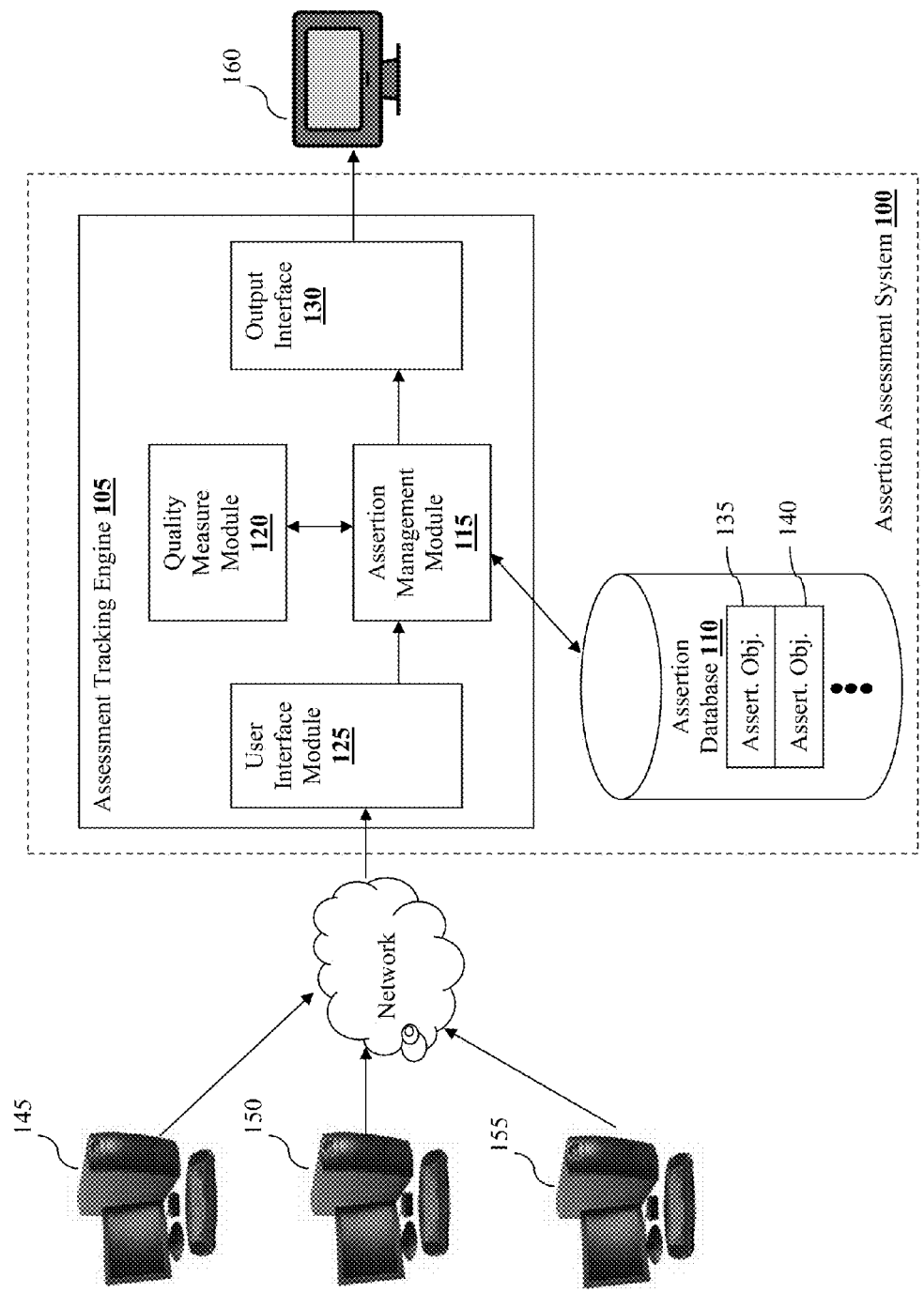
FIG. 1 is a schematic overview of a possible assertion assessment ecosystem.

FIG. 1 illustrates an assertion assessment system 100 of some embodiments. As shown, the assertion assessment system 100 comprises an assertion database 110 for storing assertion objects and an assessment tracking engine 105. In some embodiments, the assessment tracking engine 105 is communicatively coupled with the assertion database. The database 110 of some embodiments is implemented in a non-transitory permanent data storage such as a hard drive, a flash memory, etc. In some embodiments, the database 110 can be a file system, database management system, a binary large object (BLOB), a document, a table, etc. In some embodiments, the database 110 stores assertion objects that are associated with a plurality of different assertions made by users.

As shown in the figure, the assertion database 110 stores assertion object 135 and assertion object 140. Each of the assertion objects 135 and 140 represents a relationship between an assertion and an information source. For example, some assertion objects can represent a fact or a point that is supported an information source. Some assertion objects can represent opinion or a conclusion that is derived from an information source. Other assertion objects can represent an observation or a perception that is based on an information source. In some embodiments, the assertion objects can be implemented as metadata object having similar structure and relationship among other metadata objects as described in co-owned U.S. patent application 61/739,367 entitled "Metadata Management System", filed Dec. 19, 2012.

Figure 2:
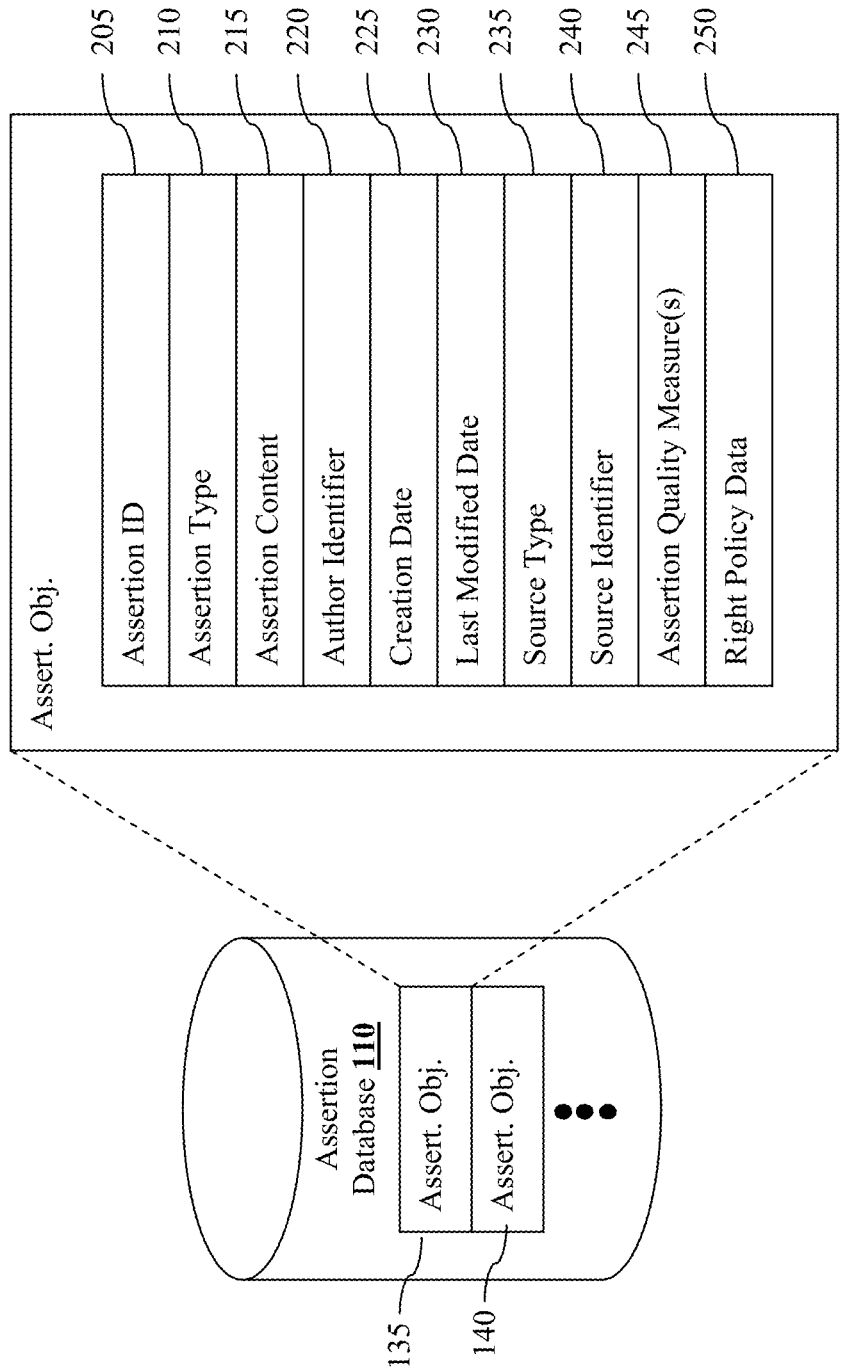
FIG. 2 is a schematic of a possible assertion object.

Each assertion object also includes a set of attributes. FIG. 2 illustrates an example assertion object in more detail. Specifically, FIG. 2 shows assertion object 135 and assertion object 140 that are stored in the assertion database 110. FIG. 2 also illustrates a set of attributes that is stored within the assertion object 135. As shown, assertion object 135 includes an assertion ID 205, an assertion type 210, assertion content 215, an author identifier 220, a creation date 225, a last modified date 230, a source type 235, a source identifier 240, one or more assertion quality measures 245, and right policy data 250. These attributes only represent examples of the kinds of attributes that can be included within an assertion object. The assertion objects of some embodiments can add attributes to or remove attributes from this set to better suit a particular situation.

The assertion ID 205 is used to uniquely identify an assertion object. It can be used as a reference identifier when it is referenced by another assertion object. It can also be used for storing the assertion object and retrieving the assertion object from the database 110.

The assertion type 210 of an assertion object can be used to indicate a type of the assertion. As mentioned above, each assertion object represents a relationship between an assertion and an information source (e.g., an opinion, conclusion, perspective, etc.). Thus, the assertion type 210 of some embodiments can indicate an assertion type of the assertion object.

The assertion content 215 stores the "assertion" of the assertion object. In some embodiments, the content is a word, a phrase, a sentence, a paragraph, or an essay. The assertion (or the assertion content) is generated by a user who has read another piece of content (i.e., the information source). The user then creates the assertion (e.g., an opinion, a conclusion, an observation, a point, an asserted fact, etc.) based on the information source. In some embodiments, the information source can be at least a portion of an article, a publication, a book, a website, or even another assertion.

The author identifier 220 identifies the author of the assertion. The identifier can be a name, a number (e.g., social security number), or a string of characters. The assertion assessment system 100 of some embodiments can include another database that stores information of different authors. The system 100 can then retrieve the author's information by querying the database using the author identifier.

The creation date 225 and the last modified date 230 indicate the date that the user created the assertion object and the date that the user last modified the object, respectively.

The source type 235 indicates the type of source information that is associated with this assertion object. For example, as mentioned above, the information source can be a book, an article, a website or even another assertion. The source type 235 can contain information that indicates the type of the source information.

The source identifier 240 identifies the information source that is associated with the assertion object. As mentioned above, the information source can be another assertion, which assertion object is also stored in the assertion database 110. In this case, the source identifier 240 can be the assertion ID of another assertion object. In other cases, the source identifier 240 can be an identifier of a document ID such as a digital object identifier (DOI). The source identifier 240 can also be a pointer that directly points to another object within the assertion database 110.

In some embodiments, the assertion object can include more than one information sources (e.g., when an assertion is derived from a combination of more than one information sources). In these embodiments, the assertion object can store more than one source type/source identifier pairs.

The assertion quality measure(s) 245 stores one or more assertion quality measures that are bound to the assertion object. As mentioned above, the assertion quality measure indicates the quality of the assertion or the quality of the relationship between the assertion and its information sources. In some embodiments, the quality measure can be quantified as a score on a pre-defined scale (e.g., numeric scores, categorical scores, etc.). In some instances, there is more than one aspect of an assertion in determining the quality of the assertion/the relationship, such as how well the assertion is supported by the information source, how accurate the assertion sound in view of common sense, etc. Thus, the assertion object can store more than one assertion quality measures for quantifying these different aspects of the assertion.

Right policy data 250 includes information that indicates which users have access to the assertion object. In some embodiments, it can include a list of users who have access to the assertion object (i.e., a white list), or a list of users who are excluded from accessing the assertion object (i.e., a black list). In other embodiments, it can indicate a specific access level (e.g., top security, public, group, etc.) so that only users who have clearance of a specific access level can access the assertion object.

When an author creates an assertion object, some or all of these attributes are generated automatically based on information collected or given by the author. At least some of these attributes can be updated or modified during the lifetime of the object. In addition, each assertion object is distinctly manageable apart from its information source. For example, the assertion object 135 can be retrieved from the assertion database independent of its information source. The user can view and modify the content of the assertion object independent of the information source (e.g., viewing the quality measure, updating the quality measure, etc.). The assertion object can also be independently published (either in paper form or digital form) without referring to the information source.

Figure 3:
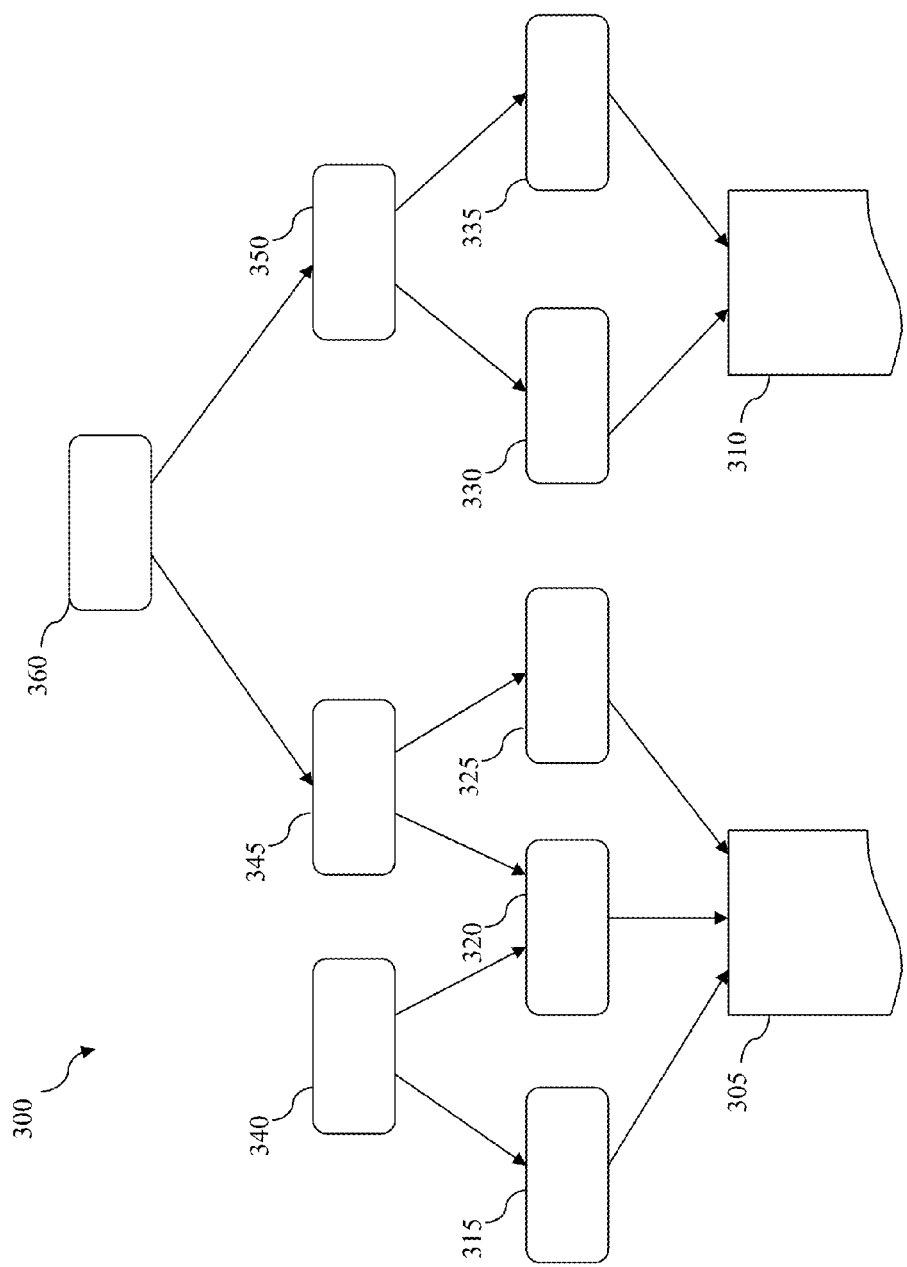
FIG. 3 presents a possible relationship graph among assertion objects.

FIG. 3 illustrates a graph 300 that represents the relationships among an example set of assertion objects and source document objects. As shown, the graph 300 includes source document objects 305 and 310. Source document objects 305 and 310 can be any type of literals, such as books, publications, articles, websites, etc. The graph 300 also includes assertion objects 315-360. As mentioned before, an assertion can be created based on a literal (e.g., a book, a publication, etc.). In this example, the graph 300 shows that assertion objects 315, 320, and 325 all point to the literal represented by source document object 305. Similarly, assertion objects 330 and 335 both point to source document object 310.

In addition to, or instead of creating an assertion based on a literal, an assertion can also be created based on other assertion(s). As shown in the graph 300, assertion object 340 identifies assertion objects 315 and 320 as its information source, indicating that the assertion object 340 is generated/derived based on assertion objects 315 and 320. Similarly, assertion objects 345 points to assertion object 320 and 325 as its information source, and assertion object 350 points to assertion object 330 and 335 as its information source.

Furthermore, an assertion can also be associated with (directly or indirectly) more than one literal. For example, assertion object 360 points to assertion objects 345 and 350 as its information source. In this case, assertion objects 345 and 350 are indirectly associated with different literals—source document object 305 and source document object 310, respectively. In some embodiments, a graph such as graph 300 in FIG. 3 represents a synthesis structure of a knowledge that is derived from one or more information sources.

Referring back to FIG. 1, the assessment tracking engine 105 includes an assertion management module 115, a quality measure module 120, an assertion a user interface module 125, and an output interface 130. The user interface module 125 communicates with computing devices 145, 150, and 155 over a network (e.g., a local area network, the Internet, etc.). Users behind the computing devices 145, 150, and 155 interact with different assertion objects through the user interface module 125 of the assessment tracking engine 105. For example, one of the functions a user can perform on an assertion object is to rate the quality of an assertion being viewed.

Figure 4:
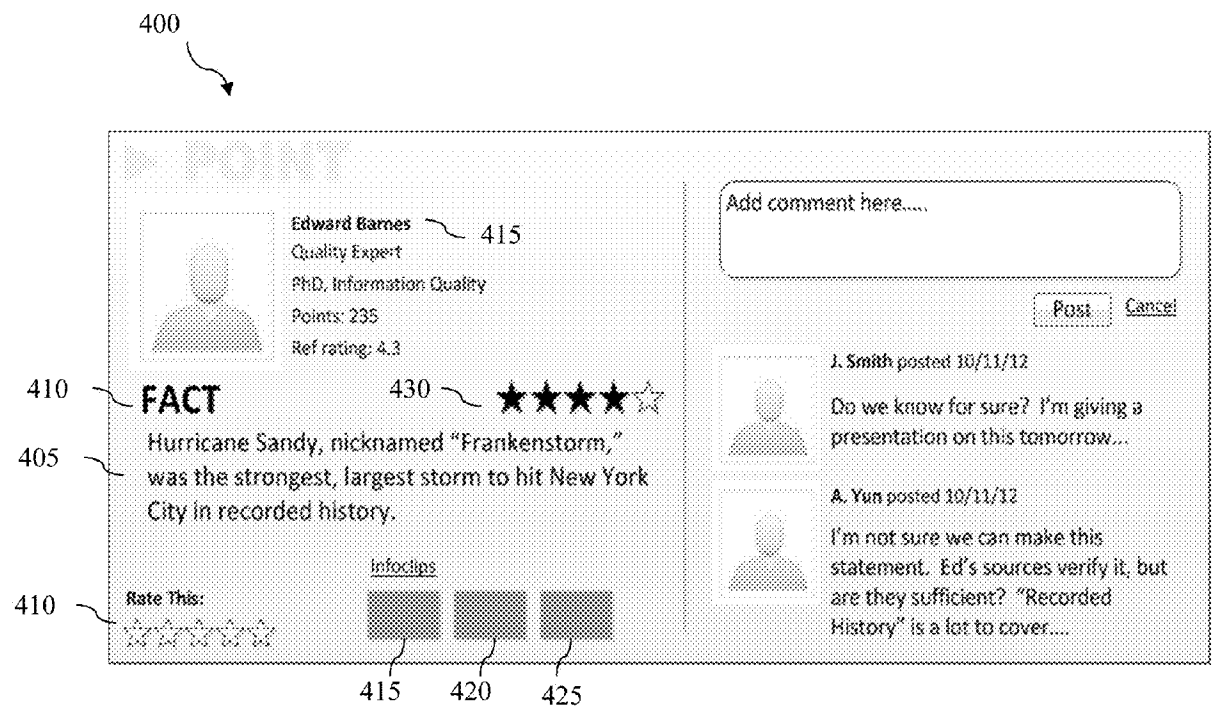

FIG. 4 illustrates an example user interface 400 that presents a user with information contained within an assertion object. In some embodiments, the user interface 400 can be generated by the assessment tracking engine 105 and presents at the user computing devices 145, 150, and 155 through the user interface module 125. As shown in FIG. 4, the interface 400 displays different attributes of an assertion object. For example, the interface 400 displays assertion content 405 which recites "Hurricane Sandy, nicknamed 'Frankenstorm,' was the strongest, largest storm to hit New York City in recorded history. The interface 400 also presents the assertion type 410 of the assertion object as a "fact".

In addition, the interface 400 displays information about the author of the assertion 415. In this example, it displays the name, title, qualification/credentials, and some information about the quality/reliability about this author. In this instance, the quality of the author is represented by a point system, and this author 415 is shown to have 235 points. The quality of the author can be affected by the rating of all assertions that he/she publishes. For example, the author will have a high rating when his/her assertions in general receive high quality ratings. Conversely, if the author's assertions in general receive low quality rating, he/she will have a low quality rating.

The interface 400 also allows a user to insert comments and presents comments that have already been inserted by other users. Furthermore, the interface 400 allows a user to rate the assertion. In this example, the interface 400 allows a user to rate an assertion based on a star system, on a scale of one to five stars. As shown, the interface 400 includes a rating interface 410 that allows a user to select anywhere between one to five stars for rating the quality of the assertion. One should appreciate that an assertion rating can include a multi-valued rating, where each value can correspond to different aspects of the assertion. For example, the assertion could be rated based on veracity, quality of citations, quality of the proposed argument or logic, or other factors.

As mentioned above, each assertion object includes one or more information source on which the assertion is based. In this example, the interface 400 shows that the assertion is based on three information sources represented by icons 415, 420, and 425. The information sources can be another assertion or a literal. In some embodiments, the user can retrieve and view these information sources by selecting the icons 415, 420, or 425. If the information source is an assertion object, the interface 400 can open up another assertion interface that is similar to interface 400 and presents information of that assertion object. If the information source is a literal, the interface 400 of some embodiments can open up a different kind of interface to present information of the literal. In some cases, the information source includes only a portion of a complete document, article, or website. In these cases, the new interface can present only the portion of the literal that is being cited/used by the author. Alternatively, the new interface can present the entire literal and highlight the portion of the literal that is being cited/used by the author. This way, the user can trace the chain of sources that is being used for the author to arrive at the assertion.

For example, referring back to FIG. 3, if the user is viewing an assertion that corresponds to assertion object 360, the interface 400 will present the information sources as assertion objects 345 and 350. The interface 400 will allow the user to select any of the source assertion objects by selecting the information source icons. If the user selects to view the source assertion object 345, another interface similar to the interface 400 will be presented to the user. The user will also be able to see that assertion object 345 refers to (or cited) information sources that correspond to assertion objects 320 and 325, through the user interface. The user can continually trace the information source chain of the assertion object 360 by traversing the assertion graph structure (such as graph 300). According to the graph 300, the information source chain from the perspective of assertion object 360 includes assertion objects 360, 345, 350, 320, 325, 330, 335, and literal objects 305 and 310.

After the user has verified the sources of the assertion through tracing the information source chain, the interface 400 allows the user to rate the quality of the assertion. As shown in FIG. 4, the interface 400 provides a rating interface 410 for a user to rate the quality of the assertion being presented in view of its information source(s). In this example, the rating interface 410 is presented as a five-star scale in which the user can rate the assertion between one to five stars. Other rating interfaces are also contemplated, such as a sliding bar, a thumb-up/thumb-down interface, etc.

As shown in FIG. 3, an assertion object can have an information source chain that spans across many levels. For example, as illustrated above, assertion object 360 first points to assertion objects 345 and 350 (level one). Assertion objects 345 and 350 in turn points to assertion objects 320, 325, 330, and 335 (level two). Lastly, assertion objects 320, 325, 330, and 335 point to literal objects 305 and 310 (level three). When assessing the quality of the relationship between the assertion and its information sources, one can assess information available to all assertion objects and/or literal objects along the information source chain. Alternatively, one can limit the assessment to the assertion's relationship with only a subset of the levels (e.g., level one only, levels one and two only) of the information source. In these embodiments, the user can only use information that is available to him/her from assertion objects/literal objects from the subset of the levels of the assertion object being assessed.

The quality of an assertion can include one or more dimensions. For example, in one dimension, the user can rate the relevance to the assertions or literals that are being cited. In another dimension, the user can rate the extent to which the underlying information sources support the assertion. In yet another dimension, the user can rate the authors of the underlying information sources. In some embodiments, the interface 400 can provide a rating interface that allows the user to rate the assertion in different dimensions.

Referring back to FIG. 1, when one or more users interact with the assertion object (e.g., rating the assertion, tracing the information source chain, providing comments, etc.), the data generated from the interaction (the interaction data) is sent to the assessment tracking engine 105 via the user interface module 125. After receiving the interaction data, the user interface module 125 forwards the interaction data to the assertion management module 115.

Based on the interaction data, the assertion management module 115 determines the assertion object that is associated with the interaction, and retrieves the assertion object from the assertion database 110. The assertion management module then sends the interaction data that is relevant for determining the quality measure to the quality measure module 120 for determining a quality measure for the assertion object.

In some embodiments, the assessment tracking engine 105 is configured to determine the quality measure of an assertion object based on one or more factors. For example, the assessment tracking engine 105 can determine the quality measure based solely on the user's rating input or any other interaction data. It is contemplated that the assertion object can be viewed and rated by the author of the assertion object and many different users who have access to view the assertion object. Interaction data of the same assertion object from different users can be received by the assessment tracking engine 105 over time. When new interaction data is received at the assessment tracking engine 105, a quality measure may have already been created and bound to the assertion object.

If there is a quality measure bound to the assertion object already, the quality measure module 120 can use the new interaction data to update the quality measure. Alternatively, the quality measure module 120 can retrieve all interaction data that has been previously received at the assessment tracking engine 105 (they can be stored in a database coupled to the engine), and determine the quality measure based on the existing interaction data and the new interaction data.

This way, the quality measure module 120 can also apply different weights to interaction data generated at different time. As an example, the quality measure module 120 can be configured to give more weight to recent interaction data than old interaction data. In addition, the quality measure module 120 can also track the users who have interacted with the assertion object and give different weights to users with different characteristics (e.g., demographics, cultural background, citizenship, residency, etc.)

When the assessment tracking engine 105 stores all interaction data that have been received for an assertion object at different times, the assessment tracking engine 105 can also be configured to analyze this data to generate trend information (e.g., do users being to like/approve the assertion more as time goes by) and other metrics related to the temporal aspect of the assertion rating. The trend information and other temporal metrics can also be used by the quality measure module 120 to generate/update the quality measure(s) of the assertion object.

In some embodiments, the assessment tracking engine 105 can also retrieve information from the assertion object and information from the assertion object's information source chain to determine the quality measure. For example, the assertion management module 115 can retrieve not only the assertion object with which the user is interacting, but also assertion objects and literal objects that are part of the information source chain of the assertion object. The assertion management module 115 can then send relevant information (e.g., quality measures of the assertion objects and literal objects, author ID and ratings of the assertion objects and literal objects, number of assertion objects and literal objects on the information source chain, creation/modification date of the assertion objects and literal objects, etc.) to the quality measure module 120. The quality measure module 120 can then analyze the relevant information to determine the quality measure for the assertion object.

In some embodiments, the quality measure module 120 is configured to determine whether a loop exist within the information source chain of the assertion object. A loop exists when the traversal of the information source chain leads back to an assertion object/literal object that has already been examined. For example, if assertion object 325 points back to assertion object 345 instead of literal object 305, a loop exists. The quality measure module 120 can be configured to update the quality measure (i.e., negatively affects the validity of the assertion) based on existence of loops in the information source chain.

Similar to user generated asserting ratings, the assertion management module 115 can selectively retrieve only a subset of the assertion objects/literal objects within the information source chain (e.g., select objects from one particular level or a subset of levels), and use only that information to determine a quality measure for the assertion object.

As mentioned above, the quality of an assertion can be measured in multiple dimensions. As such, the assessment tracking engine 105 of some embodiments is configured to generate multiple quality measures for an assertion object to represent the different dimensional quality of the associated assertion. For example, the assessment tracking engine 105 can generate an appropriateness quality measure to represent how appropriate or relevant the assertion is in view of the cited information sources. As another example, the assessment tracking engine 105 can generate a validity quality measure to represent how well the cited information sources support the validity of the assertion.

Once the quality measure module 120 generates the one or more quality measures for the assertion object, the quality measure module 120 sends the quality measures to the assertion management module 115. The assertion management module then binds the generated quality measures to the assertion object by saving/updating the quality measure attributes of the assertion object.

In some embodiments, the assertion management module 115 also configures an output device (such as output device 160) via the output interface 130 to present the quality measures of the assertion object. As shown in FIG. 4, the interface 400 generated by the assessment tracking engine 105 includes an area 430 to present the quality measure(s) of the assertion object. In this example, the assertion object has a quality score of four stars.

The assessment tracking engine also comprises a quality input interface for receiving data associated with user interactions with the assertion objects over a network It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An assertion assessment system comprising
an assertion database configured to store assertion objects in a multi-layered hierarchical structure, each assertion object has at least one directional link with another assertion object, assertion objects that are linked together in a same direction forms a chain of information sources; and
an assessment tracking engine coupled with the assertion database, wherein the assessment tracking engine comprises at least one processor and memory storing software instructions that when executed by the at least one processor causes the at least one processor to perform the following steps:
detecting that a user has traversed a first chain of information sources within the multi-layered hierarchical structure, the first chain of information sources comprising at least a first assertion object that is downlink of a second assertion object, and uplink of a third assertion object;
monitoring non-assessment interaction data representing the user's non-assessment interaction with the second assertion object;
upon receiving the non-assessment interaction data, enabling the user to provide assessment of the first assertion object;
receiving, from the user, assessment interaction data representing an assessment of the first assertion object within a first chain of information sources in the multi-layered hierarchical structure;
deriving an assertion quality measure as a function of the non-assessment interaction data related to the second assertion object and the assessment interaction data related to the first assertion object;
binding the assertion quality measure to the third assertion object; and
configuring an output device to present the assertion quality measure associated with the third assertion object.

2. The system of claim 1, wherein the first assertion object includes an assertion that is derived from content of the second assertion object, and the third assertion object includes an assertion that is derived from the assertion of the first assertion object.

3. The system of claim 2, wherein the interaction data comprises a calculated assessment from multiple assessment scores.

4. The system of claim 1, wherein the interaction data comprises an aggregated assessment.

5. The system of claim 1, wherein the assessment tracking engine is further configured to (1) receive, from the user, second non-assessment interaction data representing an assessment of a fourth assertion object that is uplink to the first assertion object within the first chain of information sources, and (2) update the assertion quality measure bound to the third assertion object as a function of the second non-assessment interaction data.

6. The system of claim 1, wherein the first assertion object is indirectly linked to the second assertion object.

7. The system of claim 1, wherein the interaction data comprises an assessment score.

8. The system of claim 1, wherein the second assertion object comprises an information source.

9. The system of claim 1, wherein the non-assessment interaction data comprises at least one of data related to the user viewing an assertion object, data related to the user inserting comments to an assertion object, and data related to the user reviewing comments of an assertion object.

10. The system of claim 1, wherein the third assertion object represents an opinion.

11. The system of claim 1, wherein the third assertion object represents a fact.

12. The system of claim 1, wherein the third assertion object represents a point.

13. The system of claim 1, wherein the third assertion object represents an observation.

14. The system of claim 1, wherein the third assertion object represents a conclusion.

15. The system of claim 1, wherein the third assertion object represents a perception.

16. The system of claim 1, wherein the assessment tracking engine is further configured to detect a loop within the first chain of information sources and automatically update the assertion quality measure bound to the second assertion objection based on the detection of the loop.

17. The system of claim 1, wherein the assertion quality measure represents an appropriateness.

18. The system of claim 1, wherein the assertion quality measures represents a validity.

19. The system of claim 1, wherein the assessment tracking engine is further configured to store the interaction data.

20. The system of claim 19, wherein the assessment tracking engine is further configured to derive interaction metrics associated with the stored interaction data.

21. The system of claim 20, wherein the interaction metrics include at least one of the following: number of assessments, assessment trends, and validation statistics.

22. The system of claim 1, wherein the assessment tracking engine is further configured to derive the assertion quality measure as a function of a demographic in addition to the interaction data.

23. The system of claim 1, wherein the assessment tracking engine is further configured to adjust a weight factor of the assessment interaction data when deriving the quality measure.

24. The system of claim 23, wherein the weighting factor depends on a user profile.

25. The system of claim 23, wherein the weighting factor depends on a cultural profile.

26. The system of claim 1, wherein the assessment tracking engine is further configured to restrict access to the information source based on a rights policy.

27. The system of claim 1, wherein the assessment tracking engine is further configured to restrict the assessment based on an access policy.

28. The system of claim 1, further comprising an assessment interface configured to present the relationship of the selected assertion object.

29. An assertion assessment system comprising
an assertion database configured to store assertion objects in a multi-layered hierarchical structure, each assertion object has at least one directional link with another assertion object, assertion objects that are linked together in a same direction forms a chain of information sources; and
an assessment tracking engine coupled with the assertion database, wherein the assessment tracking engine comprises at least one processor and memory storing software instructions that when executed by the at least one processor causes the at least one processor to perform the following steps:
detecting that a user has traversed a first chain of information sources within the multi-layered hierarchical structure, the first chain of information sources comprising at least a first assertion object that is downlink of a second assertion object, and uplink of a third assertion object;
receiving non-assessment interaction data representing the user's non-assessment interaction with the second assertion object;
deriving an assertion quality measure as a function of the non-assessment interaction data related to the second assertion object;
binding the assertion quality measure to the third assertion object; and
configuring an output device to present the assertion quality measure associated with the third assertion object.

* * * * *